(No Model.)
A. BUYS.
COMBINED BARREL TRUCK AND STAND.
No. 520,104. Patented May 22, 1894.
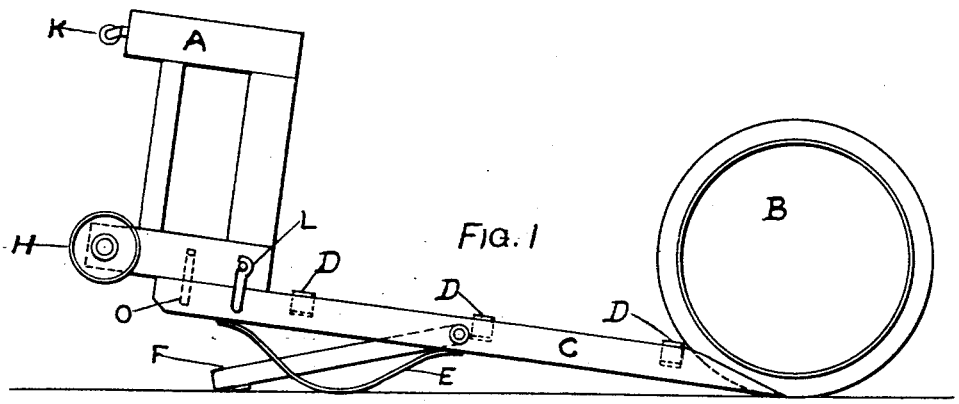
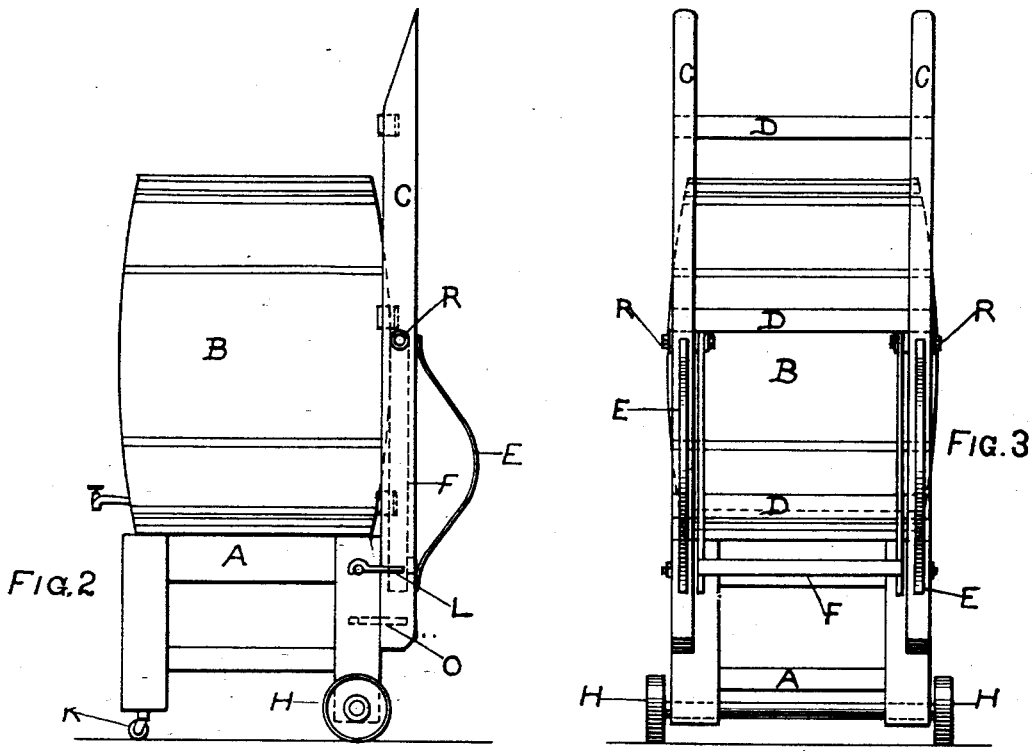
WITNESSES
INVENTOR
Adrian Buys
by Dennis L. Rogers
ATTORNEY

UNITED STATES PATENT OFFICE.

ADRIAN BUYS, OF GRAND RAPIDS, MICHIGAN.

COMBINED BARREL TRUCK AND STAND.

SPECIFICATION forming part of Letters Patent No. 520,104, dated May 22, 1894.

Application filed February 3, 1894. Serial No. 499,013. (No model.)

*To all whom it may concern:*

Be it known that I, ADRIAN BUYS, a citizen of the United States, residing at Grand Rapids, in the county of Kent and State of Michigan, have invented certain new and useful Improvements in a Combined Barrel Truck and Stand; and I do hereby declare the following to be a full, clear, and exact description of the invention such as will enable others skilled in the art to which it appertains to make and use the same.

My invention relates to a combined barrel truck and stand.

My object is to provide an article for handling barrels of sirup or other heavy material, which may also be used for supporting the same in position to be drawn out of, after being arranged in position, and consists in the construction, combination and arrangement of parts as hereinafter described and more particularly pointed out in the claims, reference being had to the accompanying drawings, wherein—

Figure 1 is a side view of the article in its reclining position; Fig. 2 a side view of the article in its upright position and Fig. 3 a rear view of the same.

Like letters of reference refer to corresponding parts throughout the drawings.

A represents a stand composed of four posts or uprights and four or more cross pieces or braces connecting the same, all composed of wood or other suitable material and of sufficient strength to support the weight of heavy barrels.

B. is a barrel.

At the bottom of the rear legs or posts is journaled the axle which carries the truck wheels H. H. on which the rear of the stand is mounted. The front posts are provided with casters K.

The stand is provided with a set of detachable handles C. provided with hooks L. engaging a corresponding stud on the post and dowels entering corresponding sockets in the post, whereby the said handles may be easily and quickly attached and removed. At the rear of said handles are secured rockers E, on which the handles rest when the structure is in its horizontal position. Said handles are connected by cross bars D. and between the two are arranged the paired pendent legs F, pivoted to said handles to swing vertically by bolts R.

The method or manner of using my truck is as follows: The truck is laid upon its back upon the floor, as shown in Fig. 1, and a barrel is rolled upon the handles and placed parallel with the handles, its bottom toward the stand, where it rests upon the cross bars, which act as a frame upon which the barrel is supported, with its bottom toward the stand. The handles are then raised, the rockers forming a rocker fulcrum on which the structure turns easily and the legs swing back to a perpendicular position, wheels H. touching the floor. The article thus acts as a truck, mounted on wheels H. H. and may be moved about as desired. The pivoted legs F are placed in such position that, when handles C. are horizontal, they form a support on which the article rests, when used as a truck. When the structure is raised to its upright position, the rear posts being journaled upon the axle connecting the wheels H. H. as shown in Fig. 3, the structure turns upon said axle as a pivot; the handles may now be detached and the structure acts as a bench or permanent support for the barrel, on which it may be moved about as desired. It will thus be seen that only a single pair of handles will be required for several stands.

By the use of my device one man can easily handle heavy barrels, which would otherwise require the united efforts of two or more persons.

What I claim, and desire to secure by Letters Patent, is—

1. In a combined barrel truck and stand the combination with the stand A. having four posts connected by braces, the front posts mounted upon casters and the rear posts journaled to an axle mounted upon wheels H. H. of the handles C. detachably secured to said rear posts, having braces D. connecting the same and provided with fulcrum rockers E. secured to the rear of each of said handles, substantially as described and for the purposes set forth.

2. The herein described barrel truck and stand consisting of the stand A. mounted upon casters K. and wheels H. as shown in combination with the detachable handles C. provided with fulcrum rockers E. and pivoted legs F. arranged substantially as and for the purposes set forth.

3. The combination with the stand A. having its front posts mounted upon the casters K. and its rear posts journaled upon the axle connecting the wheels H. with the handle C. detachably secured to the rear posts in a line in continuation of the line of said rear posts and provided with the fulcrum rockers E. and pivoted pendent legs F. substantially as described and for the purposes set forth.

In testimony whereof I affix my signature in presence of two witnesses.

ADRIAN BUYS.

Witnesses:
DENNIS L. ROGERS,
JESSE VAN DUINEN.